US 7,472,112 B2

(12) United States Patent
Pfleiger et al.

(10) Patent No.: US 7,472,112 B2
(45) Date of Patent: Dec. 30, 2008

(54) DISTRIBUTED QUERY ENGINE PIPELINE METHOD AND SYSTEM

(75) Inventors: Todd F. Pfleiger, Redmond, WA (US); Andrew E. Kimball, Sammamish, WA (US); Arpan A. Desai, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 358 days.

(21) Appl. No.: 10/601,730

(22) Filed: Jun. 23, 2003

(65) Prior Publication Data

US 2004/0260685 A1 Dec. 23, 2004

(51) Int. Cl.
*G06F 7/00* (2006.01)
*G06F 17/30* (2006.01)
*G06F 17/00* (2006.01)

(52) U.S. Cl. ........................................ 707/3; 707/104.1
(58) Field of Classification Search .................... 707/3, 707/4, 104.1, 203
See application file for complete search history.

(56) References Cited

U.S. PATENT DOCUMENTS

| 5,873,080 | A  | * | 2/1999  | Coden et al. .................... 707/3 |
| 6,078,914 | A  | * | 6/2000  | Redfern .......................... 707/3 |
| 6,226,635 | B1 | * | 5/2001  | Katariya ........................ 707/4 |
| 6,584,462 | B2 | * | 6/2003  | Neal et al. ...................... 707/3 |
| 6,697,799 | B1 | * | 2/2004  | Neal et al. ...................... 707/3 |
| 6,795,832 | B2 | * | 9/2004  | McGeorge et al. ........... 707/203 |
| 6,834,287 | B1 | * | 12/2004 | Folk-Williams et al. .. 707/103 Z |
| 6,836,778 | B2 | * | 12/2004 | Manikutty et al. ........... 707/102 |
| 2002/0091686 | A1 | * | 7/2002  | Keith, Jr. ........................ 707/5 |
| 2002/0133504 | A1 | * | 9/2002  | Vlahos et al. ............. 707/104.1 |
| 2004/0111401 | A1 | * | 6/2004  | Chang et al. .................... 707/3 |

FOREIGN PATENT DOCUMENTS

WO     WO 02/35395 A2     5/2002

OTHER PUBLICATIONS

Chen, M.S. et al., "Interleaving a Join Sequence with Semijoins in Distributed Query Processing", *IEEE Transactions on Parallel and Distributed Systems*, Sep. 1992, 3(5), 611-621.

(Continued)

*Primary Examiner*—Mohammad Ali
*Assistant Examiner*—Patrick A Darno
(74) *Attorney, Agent, or Firm*—Woodcock Washburn LLP

(57) ABSTRACT

A distributed query engine pipeline architecture comprises cascaded analysis engines that accept an input query and each identifies a portion of the input query that it can pass on to an execution engine. Each stage rewrites the input query to remove the portion identified and replaces it with a placeholder. The rewritten query is forwarded to the next analysis engine in the cascade. Each engine compiles the portion it identified so that an execution engine may process that portion. Execution preferably proceeds from the portion of the query compiled by the last analysis engine. The execution engine corresponding to the last analysis engine executes the query and makes a call to the next higher execution engine in the cascade for data from the preceding portion. The process continues until the results from the input query are fully assembled.

16 Claims, 4 Drawing Sheets

OTHER PUBLICATIONS

Liu, C. et al., "Performance Issues in Distributed Query Processing", *IEEE Transactions ono Parallel and Distributed Systems*, Aug. 1993, 4(8), 889-905.

Liu, C.C. et al., "Parallel Query Processing in Distributed Object Database Systems by Query Packets", *5th International Workshop on Research Issues in Data Engineering-Distributed Object Management (RIDE-DOM)*, Mar. 6-7, 1995, 26-31.

Papadimos, V. et al., "Distributed Queries without Distributed State", *5th International Workshop on the Web and Databases, WEBDB*, 2002, 1-6, XP-002314701.

* cited by examiner

DISTRIBUTED QUERY ENGINE PIPELINE METHOD AND SYSTEM

FIELD OF THE INVENTION

The invention relates generally to the field of software querying over data sources, and more particularly to distributed querying over data sources containing different data models.

BACKGROUND OF THE INVENTION

Querying over heterogeneous data sources is the challenge of performing a search over data sources having different data models. The challenge also presents itself where disparate data sources have the same data model. In order to query over multiple data sources with multiple data models, a multiplicity of query execution engines is normally required. The input query is normally split up by one monolithic processor which decides a priori which attached execution engine should get which portion of the original input query. The original query is thus monolithically processed to divide up the query into distinct pieces for execution. Each execution engine corresponds to a particular data model or data source. The individual query execution engines then execute their portion of the query and return the results to the monolithic processor. The monolithic processor then has the task of combining the individual query results from each of the query execution engines and stringing them together to form a complete set of query results.

This approach to heterogeneous data querying has the disadvantage of requiring a monolithic processor that can identify and manipulate all possible data sources. This is an ominous task because different data sources have very different API's or models for interacting with their data, and it is not generally feasible or desirable to build a monolithic processor that has knowledge of all data models and can manipulate all possible data sources. For example, if one wished to query over a SQL database or an XML file, the only interface to interact with an XML file is the Document Object Model (DOM), and the only interface to the database is SQL commands. As a result, one would require different code to work with the database and the XML file. The problem is exacerbated if one attempts to build a monolithic processor capable of handling additional data model types as those data types emerge to importance in the field. Under such conditions, the monolithic engine capacity may very well be exceeded by changing requirements and may require a redesign if any additional data model types are added or if an existing data model type is significantly changed.

An additional problem in creating a heterogeneous data source query mechanism is virtual querying. If a data source can be queried easily in one data model type yet it is desirable to structure the query in a second data model query language, then a conversion from one data model query language type may be needed. This need may cause multiple query language conversions requiring multiple sets of hardware and software modules and a corresponding number of optimizers to ensure efficient coding of the queries.

Thus there is a need for an architecture which avoids the problem of designing and building a monolithic query processor which is adaptable for changing query language requirements. Additionally, there is a need for an architecture that avoids the problems associated with converting multiple query languages from one form into another. The present invention addresses the aforementioned needs and solves them with an inventive architecture which is adaptable to changing query environment needs.

SUMMARY OF THE INVENTION

The invention addresses the problem of querying over multiple data sources having multiple data model types by utilizing a distributed query engine pipeline. The pipeline provides advantages over a typical solution of using a monolithic processor to divide up the input query, deal out the respective portions to specific execution engines and then combining the results to form input query results. The present invention utilizes cascaded analysis engines, without a monolithic processor, to identify and extract portions of the input query which can be compiled and executed on specific execution engines.

In one embodiment of the invention, an analysis engine is associated with an execution engine type and, although cascaded, each analysis engine operates independently from the other. Each analysis engine has two outputs: a compiled portion that the engine has identified as corresponding to an execution engine, and a rewritten query where the identified portion is removed and replaced with a placeholder. The analysis engine which lies next in the cascade receives the rewritten query, identifies its executable portion, replaces it with another placeholder and passes the twice rewritten query along with both placeholders down to the next stage.

The execution phase of processing the query preferably begins with the execution engine corresponding to the last analysis engine. The execution engine executes the query apportioned out to it, and places a call to the next higher execution engine in the cascade of execution engines to retrieve placeholder query results. Each execution engine places calls to higher stacked engines to retrieve data corresponding to the placeholders. Successive calls within cascaded execution engines eventually results in one execution engine accumulating all of the query results corresponding to input query.

Optionally, the execution phase of the pipelined query may start with the execution of the outermost or first analysis engine compilation output. As before, each execution engine may execute its apportioned query and make calls to succeeding execution engines for placeholder data. The input query return results are similar.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The present invention addresses the problem of querying over multiple types of data sources from multiple query sources. One solution to the problem of querying over virtual XML data sources may be to use a unifying intermediate language. The XML intermediate language used in the context of the present invention represents the meaning or semantics of a query. The XML intermediate language is termed a query intermediate language (QIL).

QIL addresses the problem known as "query/view composition". As an example, assume an XML query is to be performed over a virtual XML view of data, either XML, XML virtual, or other data. One approach may be to materialize that data source as XML, but this may be very inefficient and may require more memory than is available to the system. Another approach is to virtualize the view, compose the query with that virtual view, and translate the result into operations over the original data. The user sees an XML query over a logical XML data model, but the implementation queries the native data format using whatever query system it provides. This approach is used in relational databases for SQL queries over SQL views. Using an XML intermediate language, such as QIL, the original potentially complex view may be decomposed into query operations over smaller atoms of data. In this way, a query over a complex view becomes a query over a query plus a simpler view. Query composition turns this into just a query over the simpler view, thereby simplifying the problem.

The XML intermediate language QIL provides (1) a uniform representation of both the XML query and the XML view, thereby greatly simplifying the query/view composition problem and (2) treating all views as "virtual XML" greatly simplifies the system's interfaces. Instead of having one API for every possible language and data model, all the APIs can share a common data model, the operators of the XML intermediate language QIL.

Along with the use of an intermediate language representation of an input query, the present invention discloses an exemplary architecture utilizing a distributed architecture for conducting a query over multiple data sources. A true distributed architecture is able to distribute the mixed source query over different execution engines without the need for a monolithic processor to supervise the work. An exemplary distributed query engine pipeline of the present invention also has the capability to be modular in that new or modified execution engines may be added to the architecture to accommodate differing query needs. Additionally, the execution engines utilized need not be informed of the workings of the other query execution engines in order to operate correctly. Each engine may be stacked or cascaded on top of each other with each engine processing and optimizing only the parts of the query that the engine understands and passing the rest of the query to the next engine in the chain or cascade.

Exemplary Computing Device

Figure 1:
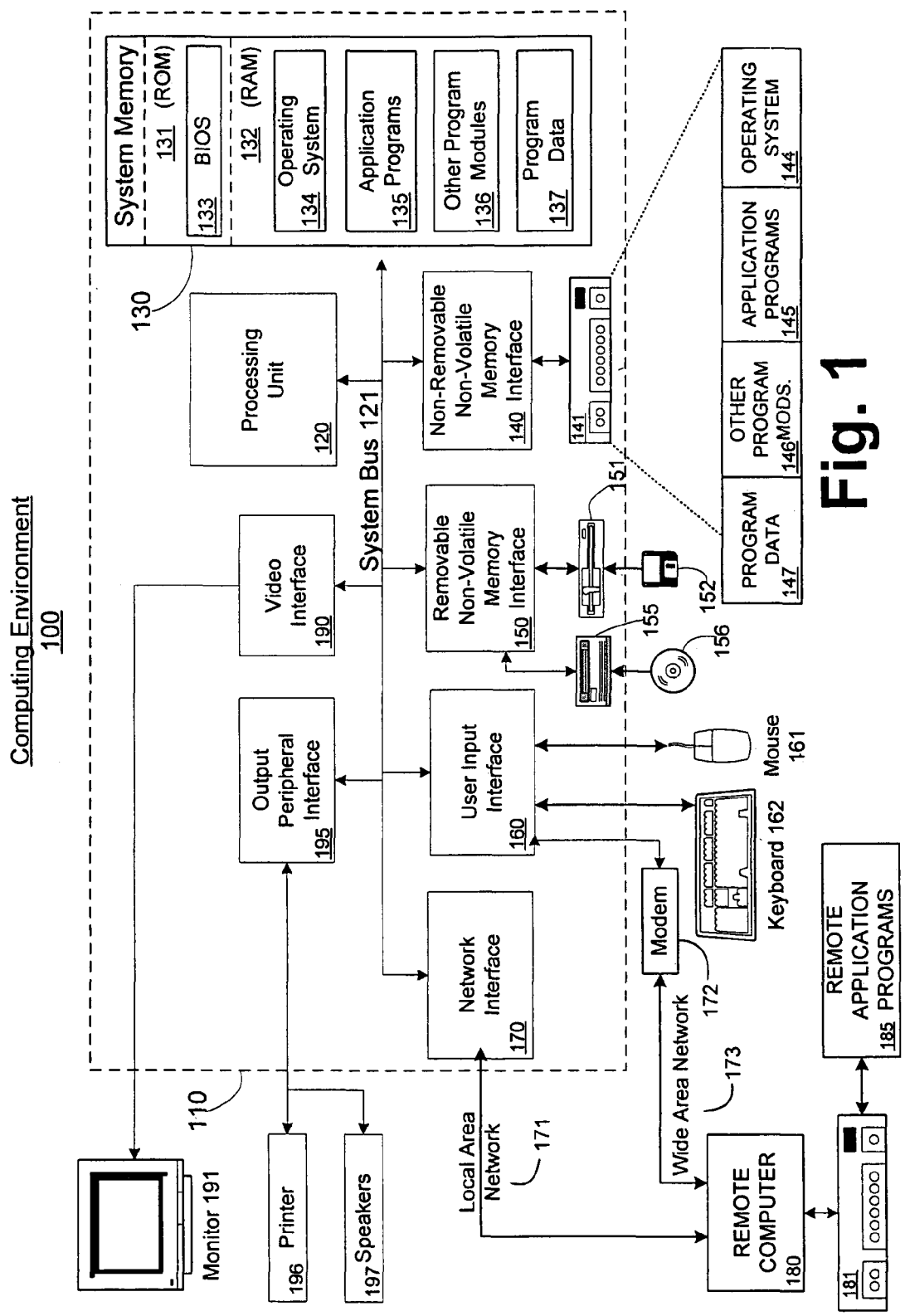
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention. Thus, while a general purpose computer is described below, this is but one example, and the present invention may be implemented with other computing devices, such as a client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory (not shown). In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, One Microsoft Way, Redmond, Wash. 98052, includes servers, building-block services, such as Web-based data storage, and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET™'s languages and services, and in other distributed computing frameworks as well.

Exemplary Embodiments

Figure 2:
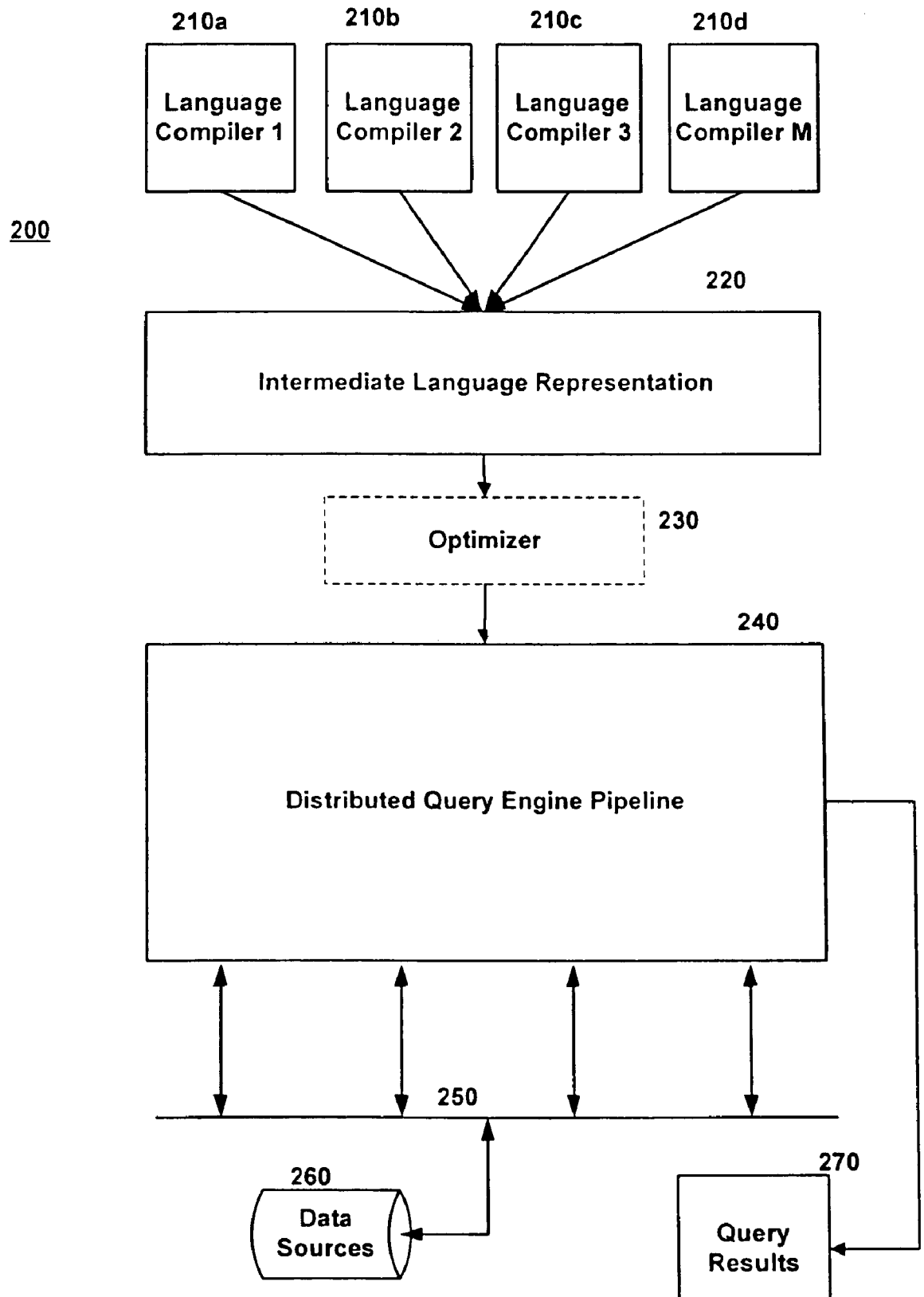
FIG. 2 depicts a block diagram architecture in which aspects of the present invention may be implemented.

FIG. 2 depicts a block diagram of an exemplary system architecture embodying aspects of the current invention. A query architecture 200 including intermediate language compilers and a distributed execution engine pipeline is shown. The architecture depicts the exemplary basic blocks implemented to receive, compile, interpret, and access data for queries over multiple data sources and types. A plurality of front-end language compilers 210 may be used and generally may be of related languages. For example, the compilers 210 may be XML related compilers which comport with XML or XML related standards. The original or input query may be received or input from any one of a plurality of input devices such as are shown in FIG. 1. Returning to FIG. 2, the front-end compilers 210 may receive a query such as an XML query, XML view, or other related XML language inquiries to produce a compiled intermediate language representation 220 of the meaning of the input query. Example language types for the front-end compilers include the W3C standards of XPath, XML Stylesheet Language (XSL), XSLT, XML. Additional examples would include XML view compilers, among others. The intermediate language abstraction between query and view languages and multiple target models allows real data, for example XML data from the Microsoft®.NET™ as well as virtual XML data, to be used as data sources.

The intermediate language generated as depicted in FIG. 2 is a representation of an input query or view. As such, it may be termed a query intermediate language (QIL) because it is an explicit representation of the meaning of a query. The query intermediate language may be viewed as a semantic representation common across all query and view language compilers 210 used in the architecture 200. For example, if the input compilers operate over XML data, then the QIL enables the abstraction of multiple different XML query languages and view definition languages (such as XPath and XSLT) over a variety of different target data sources (such as relational and non-relational data). As such, the QIL enables a common construction to support all of the compatible XML query languages. Those of skill in the art will recognize the advantage of employing an intermediate language representation in the query architecture 200. Every operation within is both explicit and unambiguous, which preferably completely decouples front-end compilers that assist in generating QIL from a distributed query engine pipeline that uses the QIL.

The preceding example represents one contextual embodiment of the current invention using an XML intermediate language representation as an input to the distributed query engine pipeline. Other intermediate language representations or direct base languages may be utilized as an input to the present invention, such as for example, a direct LDAP, AD, XML or a SQL language query inputs to name a few.

The intermediate language representation 220 may be optionally optimized 230 for more efficient processing by subsequent stages. The optimizer of FIG. 2 is presented only as context for the current invention and is not strictly required. The optimized or un-optimized intermediate language representation 220 of the input query may be presented to the distributed query engine pipeline 240.

The distributed query engine pipeline allows for queries over heterogeneous data sources 260. The engines of the pipeline distribute the intermediate language query to execution machines having specific data models. This allows a query execution to be accomplished by an execution engine that maximizes the query efficiency within a particular data model. Thus the execution engines in the pipeline 240 may be constructed so that they efficiently work on data sources comporting with the model of the data within each supported data source. For example, an execution engine for a SQL database source may be optimized for efficiency in querying over a relational database with a SQL database management system. Each of the execution engines within the pipeline has access 250 to its particular data source bearing it own data model. The distributed query engine is able to query over one or more data sources having one or more data models in a heterogeneous search. Upon execution of the distributed query, the execution engines of the pipeline normally produce query results 270 available for further processing, storage, display to a user, or provision to a subsequent software application, for example.

Figure 3:
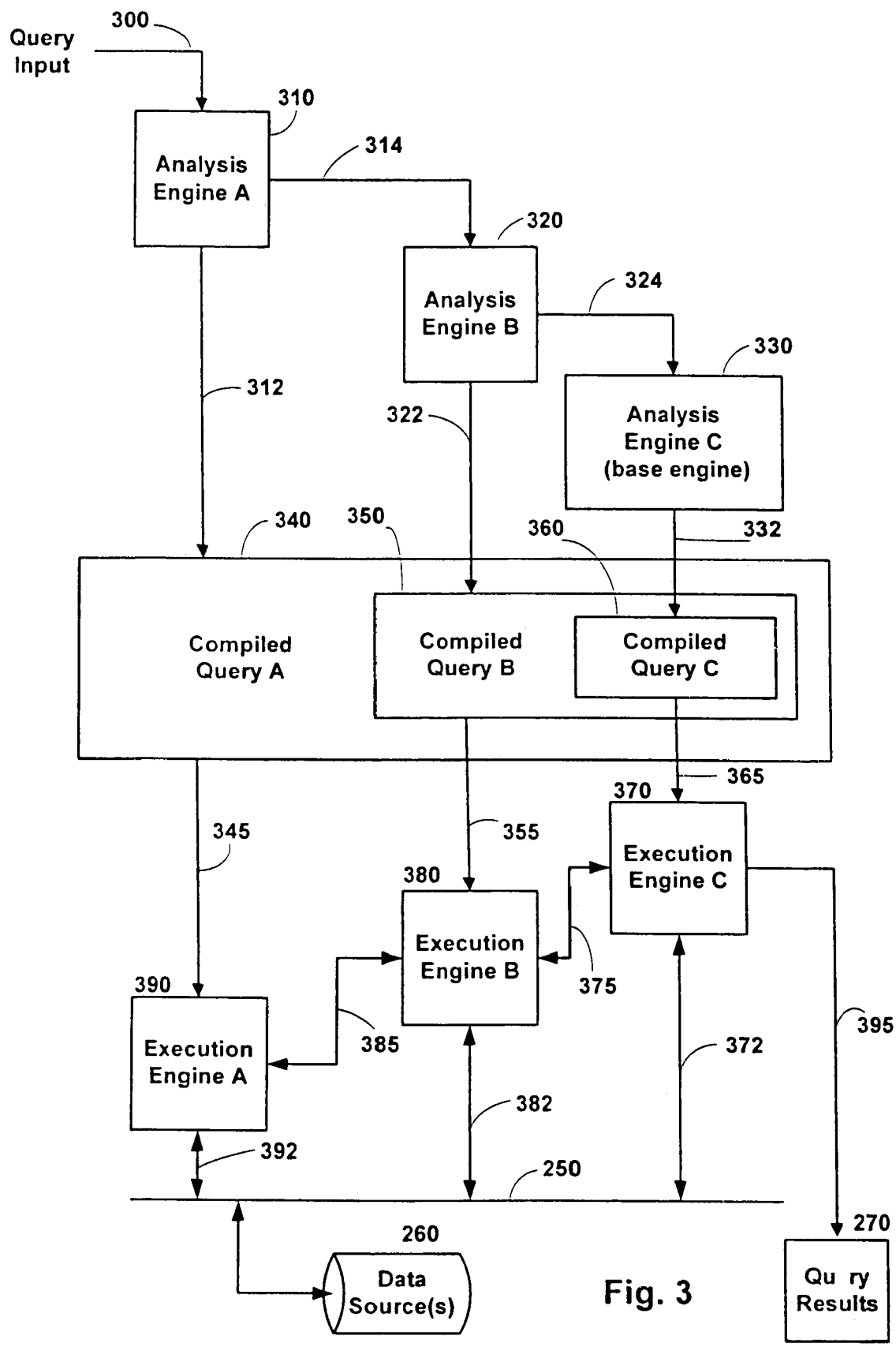
FIG. 3 depicts a block diagram architecture in which aspects of the present invention may be implemented.

FIG. 3 represents a block diagram of the distributed query engine pipeline 240 of FIG. 2. FIG. 3 depicts the basic internal architecture of the distributed query engine pipeline. The pipeline is composed of cascaded or stacked analysis engines 310, 320, 330 and execution engines 370, 380 and 390. Note the FIG. 3 illustration depicts three analysis engines and three execution engines, but as few as two and as many as N analysis/execution engine pairs maybe cascaded for a given pipeline application.

An input query 300 is received by the analysis engine A 310. The engine examines the query and finds the potions of the query that it knows how to optimize or pass off 312 to an execution engine. Analysis engine A 310 removes the identified portions and replaces them with a placeholder. The engine 310 thus rewrites the query and passes 314 the balance of the query plus the placeholder on to analysis engine B 320. Thus the engine 310 passes the modified query to the next engine in the stack.

The portion of the query that analysis engine A 310 recognizes is compiled and passed 312 to an accumulator 340 to hold the compiled query portion (compiled query A). Note that analysis engine A 310 has no knowledge of analysis engine B. Engine A extracts the portion of the query that it can recognize as that which can be processed by a specific execution engine and passes the balance of the query out. The next analysis engine in the stack, if any, then recognizes only a portion of the query that corresponds to a different execution engine.

Analysis engine B 320 accepts the modified query from engine A and identifies which portion of the modified query that it can pass 322 to an execution engine. Analysis engine B then removes that identified portion, compiles it, and sends it to an accumulator 350 holding the compiled query B. Analysis engine B 320 then rewrites the query it received by replacing, with a placeholder, the portion it identified and extracted with a placeholder. The analysis engine 320 then passes 324 the twice modified query to the next engine in the stack. Analysis engine C 330 accepts the twice modified query from engine B and identifies which portion of the twice modified query that it can pass 332 to an execution engine. Analysis engine C then removes that identified portion, compiles it, and sends it to an accumulator 360 holding the compiled query C. In system where more tiers or stages of analysis engines are implemented, analysis engine C 330 could then rewrite the query it received by replacing, with a placeholder, the portion it identified and extracted. The analysis engine C 320 could then pass the thrice modified query to the next engine in the stack. It is thus apparent that the distributed pipeline analysis engines may be cascaded as desired.

The compiled query accumulators 340, 350 and 360 together form a composite query. Each query portion (A, B and C) is associated with an execution engine that efficiently perform a query over a data source that has a specific data model. For example, compiled query A 340 is capable of being executed by execution engine A 390. Execution engine A is able to access 250 one or more data sources 260 that have at least some portion that corresponds to the data model consistent with compiled query A.

The composite query formed by the combination of compiled queries A, B and C 340, 350 and 360 respectively may be viewed as a wrapped series of queries. For example, compiled query C 360 is a sub-query and therefore a part of compiled query B 350. Thus, compiled query C is wrapped by compiled query B. Likewise, compiled query B 350 is a sub-query of compiled query A 340 and therefore compiled query B is wrapped by compiled query A.

It should be noted that the compiled and nested or wrapped queries resulting in compiled queries A, B and C are useful outputs of the present invention as these query outputs may be stored for future use. The stored queries may be executed on the same or a different computer immediately or at a delayed time.

In order to execute the composite query combination of compiled queries A, B and C, the execution engines desirably work in an order which allows successive levels of wrapping to be uncovered. For example, in order for the compiled query A to be fully executed, compiled query B should preferably be executed. But in order to execute compiled query B to be fully executed, compiled query C should preferably be executed. Thus, the order of unwrapping is preferably the innermost wrapping first, followed by successively higher levels of wrapping. In the example of FIG. 3, compiled query C may be preferably executed before compiled query B and compiled query B may be preferably executed before compiled query A. The execution engines of FIG. 3 allow for this priority of execution.

Execution engine C 370 receives 365 the innermost executable compiled query 360. The execution engine C then executes its compiled query. One or more data sources 260 containing a compatible data model are accessed, 373 and 250. The data sources 260 return 372 the requested data. However, the presence of the placeholder inserted into compiled query C by analysis engine B 320 indicates to the execution engine C that additional information is needed to complete the query results. Essentially, execution engine C calls back 375 to execution engine B 380 as an external source for information to complete the execution of compiled query C. The placeholder inserted into compiled query C by analysis engine B triggered the call to the previous execution engine as if it were an external data source.

Execution engine B 380 receives 375 the call from execution engine C. Execution engine B then inputs 355 the compiled query B 350. Execution of compiled query B proceeds by accessing, 382 and 250, one or more data sources 260. The data sources 260 return 382 the requested data. However, the presence of the placeholder inserted into compiled query B by analysis engine A 310 indicates to the execution engine B that additional information is needed to complete the query results. Execution engine B calls back 385 to execution engine A 390 as an external source for information to complete the execution of compiled query B. The placeholder inserted into compiled query B by analysis engine A triggered the call to the previous execution engine as if it were an external data source.

Execution engine A 390 receives 385 the call from execution engine B. Execution engine B then inputs 345 the compiled query B 340. Execution of compiled query A proceeds by accessing, 392 and 250, one or more data sources 260. The data sources 260 return 392 the requested data. In this instance there is no previously inserted placeholder in compiled query A, so the query can be executed in full.

Execution engine A provides the compiled query A 340 results to execution Engine B. Execution engine A has completed its response to the call from Execution engine B. Upon receipt of the query results from execution engine A, execution engine B is able to complete its execution of compiled query B 350. Execution engine B then responds by providing 375 both the information it acquired from execution engine A and its own query results to execution engine C. Execution engine B has completed its response to the call from Execution engine C.

Upon receipt of the query results from execution engine B, execution engine C is able to complete its execution of compiled query C 360. Execution engine C then responds by providing 395 both the information it acquired from execution engine B and its own query results to form the complete results of the original input query 300. Execution engine C has accumulated all of the previously extracted query results to form the completed query results.

Figure 4:
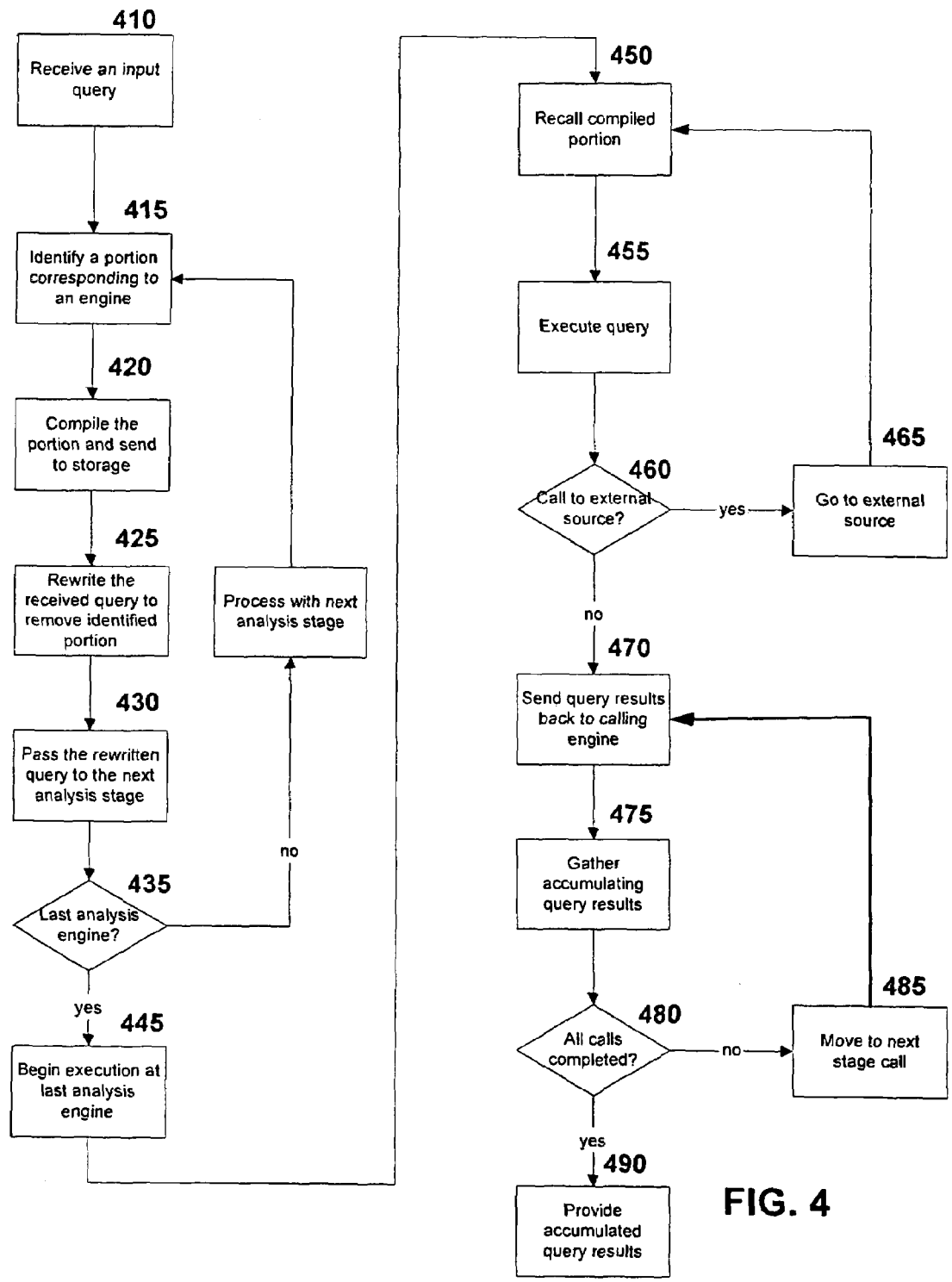
FIG. 4 illustrates a flow diagram applicable to aspects of the present invention.

FIG. 4 is a flow diagram of the exemplary process described with respect to FIG. 3. The process starts 410 by receiving an input query. The query is provided to a first analysis engine which identifies 415 a portion of the query corresponding to an execution engine and a data model. The identified portion of the input query is compiled for execution and sent to a storage location 420 for later retrieval. The first analysis engine may then rewrite the input query 425 to remove the identified portion and replace the missing portion with a placeholder. The first analysis engine may then pass the rewritten query 430 to the next analysis engine for processing the balance of the query. The progress then may change if the last analysis engine is reached 435. If the last analysis engine in the cascade of analysis engines is not reached, then the process continues with the next analysis engine stage 440 identifying the portion of the rewritten query that the next analysis engine can accommodate. The process continues with the next analysis engine stepping through the steps of identifying 415, compiling 420, rewriting 425, and passing 430 as before.

If the last analysis engine has completed its tasks 435, then the execution phase may begin 445. Preferably, the execution phase begins with the last analysis engine compilation that was stored. This last compilation is also known as the innermost compilation. Optionally, the execution may begin with the first analysis engine compilation. The flow diagram of FIG. 4 is structured to depict starting execution with the last analysis engine compilation although those of skill in the art may construct a flow where the first analysis engine compilation is used to begin the execution of the composite query.

It should be noted that the compiled query portions at the beginning of execution 445 may be a usable output of the system. The compiled queries may be executed immediately or retrieved for later use on the same or a different system employing the appropriate execution engines.

Beginning the execution with the last analysis engine 445 compilation, the corresponding execution engine may recall its corresponding compiled portion of the query 450. The engine executes the retrieved compiled query 455. Initially, there will be a placeholder in the query which will instruct the execution engine to make an external source call for information 460. The external source call may be made 465 and data from the next cascaded execution engine will be requested. In this instance, the external data source is the next cascaded execution engine. The next engine will recall from storage its corresponding compiled query 450 and execute the query 455. The executing engine may proceed to make an external source data call to the next cascaded execution engine if a placeholder is encountered in the executed query. Note that the process continues moving from one cascaded execution engine to the next until no placeholder for an external source is encountered by an execution engine.

If an execution engine in the cascade has no external placeholder and thus no external call need be made, then an entire response to that query can be given to the calling execution engine 470. The next higher engine in the cascade can then respond to its next higher execution engine call to gather or accumulate the nested query results 475. If the next higher engine is also responding to a call 480 then the fulfillment of external source calls moves to the next execution engine 485. The next execution engine then sends its query results back to the calling engine 470 to gather the accumulating query results 475. When all calls for external data are completed, the innermost execution engine, or base engine, has essentially received all the results of all of the higher level executions and accumulates the results of the entire query 490. At this point the query results from the original received input query 410 are accumulated and are available to the next process or for use by a user.

A codified example of the process outlined above is provided below. Consider, for example, the following query:

```
'An XQuery combining relational and XML operators'
    For $i in sql : table ("Customers")
    where sql : column ($i, 'CustomerID') = 'ALFKI'
    return
    <Customer id = "{sql : column ($i, 'Customer ID') }"
            name = "{ sql column ( $i, 'ContactName') }">
        <OrderList>{
            for $j in sql : table ( "Orders")
            where sql : column ($i, 'CustomerID') =
            sql column ($j, 'CustomerID')
                and position ($j) >= 3
            return <Order id=" {sql : column ($J, 'OrderID') }"/>
        }</OrderList>
    </Customer>
```

This query combines relational operators such as comparing column values with XML operators such as position. If the query is split into two parts; one portion may execute using an SQL Server engine and another portion may execute using an XML engine. The XQuery may be compiled into QIL and then analyzed for patterns that can be performed by SQL Server. The query may then be rewritten by removing those patterns, replacing them with navigation over a virtual XML document.

Once again, the advantage is that the operation materializes only the part of the mapping that is absolutely required, and as much of the query as possible is pushed into SQL Server. This may be accomplished by extracting all the SQL Server operations from the query and replacing them with navigation over a virtual XML document as follows, for example:

```
for $i in document ("virtual")/root/X1
return
    <Customer id = "{$i/@CustomerID} "name =
    "{ $i/@ContactName} ">
        <OrderList>
        {
            for $j in $i/X2
            where position ($j) >= 3
            return, Order id = {$j/@OrderID}/>
        }
        </OrderList>
    </Customer>
```

Note that the position operator is left in place for the XML engine to perform. This virtual XML document that replaced the SQL tables and columns is conceptually equivalent to the results of the SQL query:

```
'Extracted SQL parts of the XQuery, to be executed by SQL Server'
SELECT X1.CustomerID, X1.ContactName, X2.OrderID
FROM Customers X1 JOIN Orders X2 ON X1.CustomerID =
X2.CustomerID
WHERE X1.CustomerID = 'ALFKI'
FOR XML AUTO
``` which produces an XML shape like the following:

```
'Virtual XML document'
<root>
    <X1 CustomerID = "ALFKI" ContactName = "Maria Anders">
        <X2 OrderID = "10643" />
        <X2 OrderID = "10692" />
        <X2 OrderID = "10702" />
        <X2 OrderID = "10835" />
        <X2 OrderID = "10952" />
        <X2 OrderID = "11011" />
    </X1>
</root>
```

However, this in true only conceptually; in reality, no XML is ever constructed. Instead, an ordinary SQL query is sent to SQL Server to perform the join and filtering, and the rowset results are exposed to the XML engine as virtual XML through a custom XPathNavigator interface.

As mentioned above, while exemplary embodiments of the present invention have been described in connection with various computing devices and network architectures, the underlying concepts may be applied to any computing device or system in which it is desirable to implement a query system. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method of distributing portions of a query over two or more execution engines, the method comprising:
   receiving an input query into a first analysis engine of serially cascaded analysis engines, each cascaded analysis engine serving to identify and extract portions of the input query to be compiled and executed on a particular execution engine serially cascaded with other search engines;
   identifying with the first analysis engine, a portion of the input query that can be processed by a first execution engine;
   compiling the identified portion of the input query forming a first compiled portion;
   rewriting the input query to form a first rewritten query wherein the identified portion of the input query is removed from the input query and replaced by a first placeholder;
   passing an entire portion of the first rewritten query including the first placeholder to a second analysis engine of the serially cascaded analysis engines;
   identifying with the second analysis engine, a portion of the first rewritten query that can be processed by a second execution engine; and
   compiling the identified portion of the first rewritten query generating a second compiled portion wherein the input query is distributed over the first execution engine and the second execution engine for sequential execution, wherein the sequential execution is performed using serially cascaded execution engines that call to one another as a source for information.

2. The method of claim 1, further comprising:
   rewriting the first rewritten query to form a second rewritten query wherein the identified portion of the first rewritten query is removed from the first rewritten query and replaced by a second placeholder.

3. The method of claim 1, wherein the rewriting act further comprises wrapping the second compiled portion into the first compiled portion of the input query to produce a nested query for sequential execution.

4. The method of claim 1, wherein the first compiled portion and the second compiled portion may be executed over different data sources.

5. The method of claim 1, wherein a first analysis engine is a structured query language based engine and a second analysis engine is an extensible markup language based engine.

6. The method of claim 1, further comprising:
   executing partially the second compiled portion using the second execution engine forming the combination of second interim results and the first placeholder, wherein the first placeholder remains an unexecuted part of the second compiled portion;
   generating a call from the second execution engine to the first execution engine requesting the data corresponding to the first placeholder;
   executing the first compiled portion using the first execution engine to form first interim results corresponding to the first placeholder and satisfying the call;
   providing the first interim results to the second execution engine; and
   substituting the first interim results for the first placeholder forming the combination of second interim results and first interim results comprising combined input query results.

7. The method of claim 6, wherein the first execution engine and the second execution engine operate on queries comprising different data models.

8. The method of claim 1, further comprising:
   executing partially the first compiled portion using the first execution engine forming first interim results;
   generating a call from the first execution engine to the second execution engine requesting the data corresponding to an unidentified portion of the input query;
   executing the second compiled portion using the second execution engine to form second interim results and satisfying the call;
   providing the second interim results to the first execution engine; and
   combining the first interim results with the second interim results to form combined input query results.

9. The method of claim 8, wherein the first execution engine and the second execution engine operate on queries comprising different data models.

10. A system for distributive processing of an input query, the system comprising:
- a computer comprising:
- two or more serially cascaded analysis engines for separating out portions of the input query that can be compiled and executed, wherein each cascaded analysis engine serves to identify and extract portions of the input query to be compiled and executed on a particular execution engine serially cascaded with other search engines;
- two or more serially cascaded execution engines for operation on the input query; and
- access to one or more data sources, wherein the two or more analysis engines operate to independently identify and compile one or more portions of the input query wherein:
  - at least one of the two or more analysis engines rewrites the input query to remove the portion of the input query that corresponds to an execution engine and replaces the portion with a placeholder,
  - the rewritten query, including the placeholder is input to a subsequent analysis engine in the two or more serially cascaded analysis engines; and
  - the two or more execution engines sequentially process the one or more compiled portions of the input query such that partial query results from one execution engine are passed to a subsequent execution engine using calls between execution engines and combined to form overall input query results.

11. A computer-readable storage media containing instructions, which when run on a computer, execute a method of distributing portions of a query over two or more execution engines, the method comprising:
- receiving an input query into a first analysis engine of a serial cascade of analysis engines, each cascaded analysis engine serving to identify and extract portions of the input query to be compiled and executed on a particular execution engine serially cascaded with other search engines;
- identifying with the first analysis engine, a portion of the input query that can be processed by a first execution engine;
- compiling the identified portion of the input query forming a first compiled portion;
- rewriting the input query to form a first rewritten query wherein the identified portion of the input query is removed from the input query and replaced by a first placeholder;
- passing an entire portion of the first rewritten query including the first placeholder to a second analysis engine of the serial cascade of analysis engines;
- identifying with the second analysis engine, a portion of the first rewritten query that can be processed by a second execution engine; and
- compiling the identified portion of the first rewritten query generating a second compiled portion wherein the input query is distributed over the first execution engine and the second execution engine; and
- wherein the rewriting act further comprises wrapping the second compiled portion into the first compiled portion to produce a nested query for sequential execution, wherein calls are used between the first execution engine and the second execution engine to retrieve information.

12. The computer-readable storage medium of claim 11, further comprising:
- executing partially the second compiled portion using the second execution engine forming the combination of second interim results and the first placeholder, wherein the first placeholder remains an unexecuted part of the second compiled portion;
- generating a call from the second execution engine to the first execution engine requesting the data corresponding to the first placeholder;
- executing the first compiled portion using the first execution engine to form first interim results corresponding to the first placeholder and satisfying the call;
- providing the first interim results to the second execution engine; and
- substituting the first interim results for the first placeholder forming the combination of second interim results and first interim results comprising combined input query results.

13. The computer readable storage medium of claim 12, wherein the first execution engine and the second execution engine operate on queries comprising different data models.

14. The computer readable storage medium of claim 12, wherein the first compiled portion and the second compiled portion are executed over different data sources.

15. The computer readable storage medium of claim 11, further comprising:
- executing partially the first compiled portion using the first execution engine forming first interim results;
- generating a call from the first execution engine to the second execution engine requesting the data corresponding to an unidentified portion of the input query;
- executing the second compiled portion using the second execution engine to form second interim results and satisfying the call;
- providing the second interim results to the first execution engine; and
- combining the first interim results with the second interim results to form combined input query results.

16. The computer readable storage medium of claim 15, wherein a first analysis engine is a structured query language based engine and a second analysis engine is an extensible markup language based engine.

* * * * *